United States Patent [19]

Hawkins et al.

[11] Patent Number: 4,637,466

[45] Date of Patent: Jan. 20, 1987

[54] METHOD OF IMPROVING CONFORMANCE IN STEAM FLOODS WITH CARBOXYLATE STEAM FOAMING AGENTS

[75] Inventors: Jeffrey T. Hawkins; Vernon H. Schievelbein, both of Houston, Tex.

[73] Assignee: Texaco Inc., White Plains, N.Y.

[21] Appl. No.: 848,006

[22] Filed: Apr. 3, 1986

[51] Int. Cl.$^4$ .................... E21B 43/22; E21B 43/24
[52] U.S. Cl. .................................. 166/272; 166/309; 252/8.554
[58] Field of Search ............... 166/272, 273, 274, 303, 166/309; 252/8.55 D; 175/69

[56] References Cited

U.S. PATENT DOCUMENTS

| 4,457,373 | 7/1984 | Balzu et al. | 252/8.55 D X |
| 4,478,281 | 10/1984 | Balzu et al. | 252/8.55 D X |
| 4,485,873 | 12/1984 | Balzu et al. | 252/8.55 D X |
| 4,540,049 | 9/1985 | Hawkins et al. | 166/272 |
| 4,540,050 | 9/1985 | Huang et al. | 166/272 |
| 4,577,688 | 3/1986 | Bassmann et al. | 162/272 X |
| 4,582,138 | 4/1986 | Balzu | 252/8.55 D X |

FOREIGN PATENT DOCUMENTS 456517 9/1936 United Kingdom .

Primary Examiner—Stephen J. Novosad
Assistant Examiner—Thomas J. Odar
Attorney, Agent, or Firm—Jack H. Park; Kenneth R. Priem; Harold J. Delhommer

[57] ABSTRACT

The disclosed invention is a group of steam foaming agents for injection with steam and a non-condensable gas to decrease permeability in steam swept zones and increase oil recovery. The foaming agents have the general formula:

$$RO(R'O)_nR''CO_2M$$

where R is an alkyl radical, branched or linear, having from about 8 to about 24 carbon atoms in the alkyl chain, R' is ethylene, propylene or a mixture of ethylene and propylene, n has an average value of about 3 to about 11, R" is methylene or ethylene, and M is an alkali metal or ammonium ion.

11 Claims, No Drawings

METHOD OF IMPROVING CONFORMANCE IN STEAM FLOODS WITH CARBOXYLATE STEAM FOAMING AGENTS

BACKGROUND OF THE INVENTION

The present invention relates to carboxylate steam foaming agents which when injected with steam and a non-condensable gas will significantly improve vertical conformance.

When an oil reservoir is subjected to steam injection, steam tends to move up in the formation, whereas condensate and oil tends to move down due to the density difference between the fluids. Gradually, a steam override condition develops, in which the injected steam sweeps the upper portion of the formation but leaves the lower portion untouched. Injected steam will tend to follow the path of least resistance from the injection well to a production well. Reservoir permeability to steam also increases as oil is swept out by the steam. Thus, areas of high permeability will receive more and more of the injected steam which further raises the permeability of such areas. This phenomenon exists to an even larger degree with low injections rates and thick formations. The steam override problem worsens at greater radial distances from the injection well because steam flux decreases with increasing steam zone radius.

Although residual oil saturation in the steam swept region can be as low as 10%, the average residual oil saturation in the formation remains much higher due to poor vertical conformance. It is because of the creation of steam override zones that vertical conformance in steam floods is usually poor.

It has long been the concern of the oil industry to improve the vertical conformance of a steam flood by reducing the permeability of the steam swept zone by various means. The injection of numerous chemicals such as foams, foaming solutions, gelling solutions or plugging or precipitating solutions have been tried. Because of the danger of damaging the reservoir, it is considered important to have a non-permanent means of lowering permeability in the steam override zones. For this reason, certain plugging agents are deemed not acceptable. In order to successfully divert steam and improve vertical conformance, the injected chemical should be (1) stable at high steam temperatures of about 300° to about 600° F., (2) effective in reducing permeability in steam swept zones, (3) non-damaging to the oil reservoir and (4) economical.

The literature is replete with references to various foaming agents which are employed to lower permeability in steam swept zones. The foaming agents of the prior art require the injection of a non-condensable gas to generate the foam in conjunction with the injection of steam and the foaming agent. U.S. Pat. Nos. 3,366,175 and 3,376,924 disclose the injection of a steam foam in a hydrocarbon reservoir at the interface between the hydrocarbons and the gas cap to aid in recovery. U.S. Pat. Nos. 3,410,344 and 3,994,345 disclose the use of a steam foaming agent selected from the generic groups of polyethoxyalkanols and alkylaryl sulfonates to reduce permeability in steam channels. The use of similar surfactants such as sodium lauryl sulfoacetate and alkyl polyethylene oxide sulfate are disclosed as foaming agents in carbon dioxide foams in U.S. Pat. Nos. 4,088,190 and 4,113,011, respectively. U.S. Pat. No. 4,018,278 discloses the use of sulfonated, ethyoxylated alcohols or alkylphenols in surfactant flooding solutions without the use of steam. A group of ether sulfonate foaming agents are disclosed in U.S. Pat. Nos. 4,540,049 and 4,540,050.

Several trademarked foaming agents have been field tested by petroleum companies in steam floods. These include such trademarked chemicals as Stepanflo 30 sold by Stepan Chemical Co., Suntech IV sold by Sun Oil, Thermophoam BWD sold by Farbest Co. and COR-180 sold by Chemical Oil Recovery Co. U.S. Pat. No. 4,086,964 discloses the use of lignin sulfonates for a foaming agent and U.S. Pat. No. 4,393,937 discloses the use of alpha olefin sulfonates as a steam foaming agent. See also United Kingdom Pat. No. 2,095,309 for a disclosure of alpha olefin sulfonate foaming agents.

Disclosures of laboratory and field tests of Stepanflo are contained in SPE Paper No. 10774 entitled "The Laboratory Development and Field Testing of Steam/Noncondensible Gas Foams for Mobility Control in Heavy Oil Recovery" by Richard E. Dilgren et al. presented at the 1982 California Regional Meeting of the SPE held in San Francisco March 25-26, 1982 and the *Journal of Petroleum Technology*, July 1982, page 1535 et seq. The same *Journal of Petroleum Technology* also discussed tests conducted on Thermophoam BWD. Additional information on tests of Thermophoam BWD are also disclosed in Department of Energy Publications DOE/SF-10761-1, -2 and -3.

Tests of the COR-180 foaming agent of Chemical Oil Recovery Co. are disclosed in SPE Paper No. 11806 entitled "Improvement in Sweep Efficiencies in Thermal Oil-Recovery Projects Through The Application of In-Situ Foams" by R. L. Eson, presented at the International Symposium on Oil Field and Geothermal Chemistry in Denver, June 1-3, 1983 and Department of Energy Reports Nos. DOE/SF/10762-1, -2 and -3.

SUMMARY OF THE INVENTION

The present invention pertains to novel steam foaming agents for injection with steam and a non-condensable gas to decrease permeability in steam swept zones and ultimately, increase oil recovery with steam flooding. The novel foaming agents have the general formula $$RO(R'O)_n R'' CO_2^- M^+$$

where R is an alkyl radical, branched or linear, having from about 8 to about 24 carbon atoms in the alkyl chain, R' is ethylene, propylene or a mixture of ethylene and propylene, n has an average value of about 3 to about 11, R'' is methylene or ethylene, and M is an alkali metal or ammonium ion.

DETAILED DESCRIPTION

The steam foaming agents for the present invention are highly effective in reducing permeability of steam swept zones. These novel foaming agents have an affinity for formation areas of high permeability and low oil saturation. When set up in such areas, they substantially reduce the permeability of the steam swept zones, forcing steam into other, unswept areas of the formation.

The novel steam foaming agents of the present invention are represented by the general chemical formula:

$$RO(R'O)_n R'' CO_2^- M^+,$$

where R is an alkyl radical, branched or linear, having from about 8 to about 24 carbon atoms, preferably about 11 to about 15 carbon atoms in the alkyl chain, R' is ethylene, propylene or a mixture of ethylene and propylene, preferably ethylene, n has an average value of about 3 to about 11, preferably about 5 to about 9, R" is methylene or ethylene, and M is an alkali metal or ammonium cation. The preferred alkali metal ions are sodium, lithium and potassium. It should be noted that n is an average value and that the invention compounds will normally have varying degrees of ethoxylation or propoxylation.

These novel foaming agents are sufficiently stable at the high temperatures encountered in steam floods (300° to 600° F.). They are not permanent and do not damage the reservoir.

The most preferred foaming agent is the carboxylate

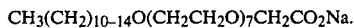
$CH_3(CH_2)_{10-14}O(CH_2CH_2O)_7CH_2CO_2Na$.

The mixture of steam, non-condensable gas and foaming agent can bring about a substantial reduction in permeability when injected into the high permeability areas of the formation at almost any time. Vertical conformance will be significantly improved whether the steam foaming agent and gas is injected into the formation at the very beginning of steam injection, before steam breakthrough at the production well or after steam breakthrough. The most preferred injection times occur shortly after steam injection has begun and a short time before steam breakthrough will occur at the production wells. In the first instance, the injection of the steam foaming agent and gas near the beginning of steam injection will help prevent narrow steam channels from being formed and extended through to the production wells. The injection of the foaming agent prior to steam breakthrough will postpone the time of steam breakthrough and spread the steam over a wider area near the production wells.

The invention foaming agents will also work quite well if steam breakthrough occurred in the past and low oil saturation steam override zones exist. But in such a situation, the foaming agent must be injected in greater quantities to reduce permeability in a swept out area. Generally, the mixture of steam, gas and foaming agent must be injected into the reservoir at a higher pressure than the previous injection of steam so that the foam will move a sufficient distance into the high permeability areas. However, the injection pressure must be less than the reservoir fracturing pressure or damage to the formation will occur.

The foaming agent and gas may be injected into the formation without the concurrent injection of steam, provided that steam is injected into the formation prior to and after the injection of the foaming agent and gas. But preferably, the steam is coinjected with the foaming agent and gas.

The foaming agent, non-condensable gas and steam should be injected in a mixture such that the foaming agent comprises about 0.01% to about 5% preferably about 0.02% to about 1.5% by weight of the steam (cold water equivalent). The foaming mixture contains about 0.01 to about 5, preferably about 0.01 to about 1.5 thousand standard cubic feet of a non-condensable gas per barrel of steam (cold water equivalent). It is contemplated that the injected steam range from about 20% to about 90% quality. Individual tests should be run to tailor the concentration of the foaming agent in steam as the increased effectiveness of the foaming agent per increased concentration of foaming agent quickly reaches a point of diminishing returns. Furthermore, other surfactants may also be included in the steam and foaming agent mixture to increase oil recovery providing they do not substantially inhibit the foam.

In general, the non-condensable gas used in the foam mixture of the present invention can comprise substantially any gas which (a) undergoes little or no condensation at the temperatures and pressures at which the foam mixture is subjected, and (b) is substantially inert to and compatible with the foaming agent and other components of that mixture. Such a gas is preferably nitrogen but can comprise other substantially inert gases, such as air, ethane, methane, flue gas, fuel gas, or the like.

Two conditions will be prevalent in a steam override zone, especially in a well developed override zone. The steam flux in the override zone will be high relative to other portions of the reservoir because the vast majority of the steam will be passing through the override zone. In addition, the residual oil saturation in the override zone will be relatively low due to continuous steam flooding.

No chemical or physical deterioration has been detected in the foaming agents used in the formation at steam injection temperatures. Additionally, no problems have been encountered with thermal or hydrolytic stability of the agents. The foams tested have continued to be effective up to three days but since the foaming agent will be eventually produced, it is generally necessary to continue injecting foam into the high permeability areas. Cooling problems also fail to affect foam stability. This is because the foam will go preferentially into the high permeability areas of the steam override which are very hot. The cool areas of the formation are those areas of low permeability which the foam will avoid.

Additional discussion and experimental correlations on steam foaming agents can be found in U.S. Pat. Nos. 4,540,049 and 4,540,050, the disclosures of which are incorporated herein by reference.

The following examples will further illustrate the novel steam foaming agents of the present invention. These examples are given by way of illustration and not as limitations on the scope of the invention. Thus, it should be understood that the composition and concentration of the foaming agents may be varied to achieve similar results within the scope of the invention.

EXAMPLES 1-12

Multiple runs were made in a foam testing apparatus to determine the effectiveness of the foaming agents of the present invention and several well known steam foaming agents when injected with steam in the absence of a non-condensable gas. A 90 cm linear cell with an inside diameter of 3.4 cm was packed with sand, oil and water to a porosity of 0.4 and an oil saturation of 0.23. The sand pack was steam flooded at a back pressure of 200 psig and an injection rate of 4 ml per minute of steam (cold water equivalent) until no more oil was produced. This left a residual oil saturation of 10.2%. The pressure drop across the cell length with the steam injection only was measured and determined to be approximately 15 psig.

A high concentration of 6% active foaming agent (corresponding to about a 1% in situ concentration in the aqueous phase in the cell) was then injected with steam at approximately 0.5 ml per minute. Steam injection was held constant at 4.0 ml/min. The pressure drop was recorded continuously. When the pressure drop stabilized, nitrogen was injected at 8.4 ml/min. Once the pressure drop restabilized, it was recorded for each foaming agent.

The foaming agents tested in Examples 1-7 are identified below. Agent 1 is a carboxylate employed in the present invention and Agents 2-7 are ether sulfonates disclosed in U.S. Pat. No. 4,540,050. Examples 8-12 were run to test and compare commercially available steam foaming agents. Table 1 illustrates that the carboxylate Agent 1 performed almost as well as the ether sulfonate Agents 2-5 and significantly better than the commercially available steam foaming agents.

$CH_3(CH_2)_{10-14}O(CH_2CH_2O)_7OCH_2CO_2Na$  Agent 1

$CH_3(CH_2)_{15-19}O(CH_2CH_2O)_3CH(CH_3)—CH_2SO_3Na$  Agent 2

$CH_3(CH_2)_{15-17}O(CH_2CH_2O)_4—CH(CH_3)—CH_2SO_3Na$  Agent 3

$CH_3(CH_2)_{11-13}O(CH_2CH_2O)_4—CH(CH_3)—CH_2SO_3Na$  Agent 4

$CH_3(CH_2)_{11-13}O(CH_2CH_2O)_2—CH(CH_3)—CH_2SO_3Na$  Agent 5

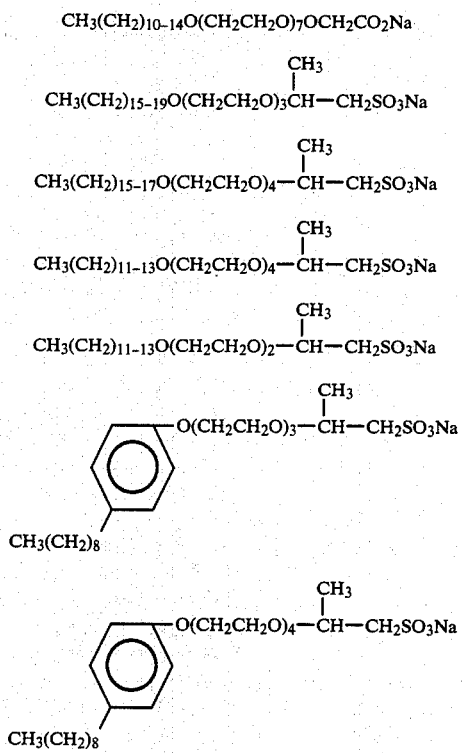

Agent 6

Agent 7

TABLE I

| Ex. | Foaming Agent | Pressure Drop Across Cell (psi) at N₂ Flow Rates Of | | | |
|---|---|---|---|---|---|
| | | 0 ml/min | 8.4 ml/min | 16.8 ml/min | 25.2 ml/min |
| | Steam Only | 10 | | | |
| 1 | Agent 1 | | 194 | | |
| 2 | Agent 2 | 120 | 312 | 355 | |
| 3 | Agent 3 | 185 | 250 | 360 | |
| 4 | Agent 4 | 10 | 260 | 280 | |
| 5 | Agent 5 | | 295 | | |
| 6 | Agent 6 | | 129 | | |
| 7 | Agent 7 | 10 | 15 | 16 | 126 |
| 8 | Stepanflo 30 | 10 | 25 | 25 | 40 |
| 9 | Stepanflo 1390 | 10 | 134 | 178 | |
| 10 | Thermophoam BWD | 10 | 64 | 69 | 144 |
| 11 | Bioterge AS-40 | 10 | 130 | | |
| 12 | Suntech IV | 10 | 141 | 139 | 143 |

Stepanflo 30 and 1390 - trademarked alpha olefin sulfonates sold by Stepan Chemical Co.
Thermophoam BWD - a trademarked alpha olefin sulfonate sold by Farbest Co.
Bioterge AS-40 - a trademarked alpha olefin sulfonate sold by Stepan Chemical Co.
Suntech IV - a trademarked sulfonate sold by Sun Oil Co.

To determine a lower limit on the nitrogen flow rate, it was felt that a minimum increase in pressure drop over the cell to assure effective operation would be about ten times the pressure drop with injection of steam only. Hence, the lower limit of nitrogen flow is the flow rate that would cause the minimum desired 100 psig pressure drop across the cell. The results of Table I were linearly interpolated to obtain the nitrogen flow rate that would yield a 100 psig pressure drop with a 6% (corresponding to about a 1% in situ concentration) injection of foaming agent. It should be noted that these are only rough estimates and that the behavior of these foaming agents is not entirely linear.

TABLE II

| | | Lower Limit N₂ Flow Rate | |
|---|---|---|---|
| Example | Foaming Agent | ml/min. | MSCF/bbl Steam |
| 2 | Agent 2 | 0 | 0 |
| 3 | Agent 3 | 0 | 0 |
| 4 | Agent 4 | 3.0 | 0.18 |
| 7 | Agent 7 | 23.2 | 1.38 |
| 8 | Stepanflo 30 | 40.0 | 2.38 |
| 9 | Stepanflo 1390 | 6.1 | 0.36 |
| 10 | Thermophoam BWD | 20.3 | 1.21 |
| 11 | Bioterge AS-40 | 6.3 | 0.37 |
| 12 | Suntech IV | 5.8 | 0.35 |

EXAMPLES 13-14

Our research has linked the ability of a foaming agent to foam in the open space of a cylinder at the elevated temperatures and pressures of steam floods with the ability of a foaming agent when co-injected with steam and nitrogen to produce an increase in pressure drop across a sandpack. This increase in pressure drop is indicative of the foaming agent's ability to retard the flow of steam through a hydrocarbon reservoir.

The Agent 1 carboxylate was compared to Agent 3, one of the best of the ether sulfonates. To test the ability to generate a foam at steam flooding temperatures and pressures, 6% aqueous solutions of the foaming agents were added to an empty cylinder and foamed with nitrogen. As can be seen from the results of Table III, the carboxylate Agent 1 achieved similar foam results to the ether sulfonate Agent 3.

TABLE III

| | | Foam Formation Rate (in/min) at | |
|---|---|---|---|
| Ex. | Foaming Agent | 250° F., 200 psig | 350° F., 400 psig |
| 13 | Agent 1 | 13.46 | 2.48 |
| 14 | Agent 3 | 9.6 | 2.99 |

EXAMPLES 15-22

Further experiments were conducted with the foam testing apparatus to transform the pressure drop figures into more readily identifiable numbers of percent oil recovery. The procedure of Examples 1-12 was followed and the foam mixture was injected with 6% (corresponding to about a 1% in situ concentration) foaming agent and 16.8 ml/min of nitrogen. The three agents tested in Examples 20-22 offered commanding oil recovery efficiency advantages over the other foaming agents of the prior art. As the carboxylate Agent 1 of the present invention performed almost as well as the ether sulfonate Agents 2, 3 and 4 in the pressure drop tests, the carboxylate Agent 1 would be expected to recover much more oil than the other foaming agents of the prior art.

TABLE IV

| Example | Foaming Agent | Δ P (psi) | % Oil Recovery |
|---|---|---|---|
| 15 | Thermophoam BWD | 69 | 28.3 |
| 16 | Siponate 301-10 | 32 | 31.0 |
| 17 | Stepanflo 20 | 19 | 40.2 |
| 18 | Igepal CA 720 | 11 | 4.1 |
| 19 | COR-180 | 12 | 24.3 |
| 20 | Agent 4 | 280 | 83.7 |
| 21 | Agent 3 | 360 | 76.3 |
| 22 | Agent 2 | 335 | 56.7 |

Siponate 301-10 - a trademarked alpha olefin sulfonate sold by Alcolac Co.
Stepanflo 20 - a trademarked alpha olefin sulfonate sold by Stepan Chemical Co.
Igepal CA 720 - a trademarked alkyl phenoxy polyoxy-ethylene ethanol sold by GAF Corp.
COR-180 - trademarked oxyethylene sulfates sold by Chemical Oil Recovery Co.

For comparison purposes, Table V has been compiled to present the foaming agent concentration and nitrogen amounts used in recent field tests of foaming agents.

TABLE V

| Foaming Agent | Field | bbl Agent bbl Steam | MSCF $N_2$ bbl Steam |
|---|---|---|---|
| Suntech IV | Kern River | 0.714% | 0.078 |
| COR-180 | Witmer B2-3 | 0.104% | 0 |
| Thermophoam BWD | San Ardo | 0.090% | 0.06 |
| Thermophoam BWD | Midway-Sunset | 0.060% | 0.014 |
| Stepanflo 30 | Kern-River Mecca | 0.500% | 0.0207 |

It is apparent that these field tests were conducted with extemely low concentrations of carboxylate foaming agent and relatively small quantities of injected nitrogen per barrel of steam. Although it is probable that larger quantities of foaming agent and nitrogen could have been more effective, the economics of field tests, even on a small scale, require the use of the smallest quantities practicable. The economics become even more critical for large, field-wide applications.

It should be remembered that the carboxylate foaming agents of the present invention and Agents 2–7 performed substantially better than the agents of the prior art at higher concentrations in laboratory tests. Carboxylate foaming agents would probably be employed at concentrations similar to those of Table V in field tests.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A process for recovering hydrocarbons from an underground hydrocarbon formation penetrated by at least one injection well and at least one production well, which comprises:
   injecting steam into an injection well;
   injecting into the injection well a mixture of steam, about 0.01 to about 5 thousand standard cubic feet of a non-condensable gas per barrel of steam in the injected mixture and about 0.01% to about 5% by weight of a foaming agent based upon the weight of the steam in the injected mixture,
   said foaming agent represented by the formula, $RO(R'O)_nR''CO_2^-M^+$, where R is an alkyl radical, branched or linear, having from about 8 to about 24 carbon atoms in the alkyl chain, R' is ethylene, propylene or a mixture of ethylene and propylene, n has an average value of about 3 to about 11, R'' is methylene or ethylene, and M+ is an alkali metal or ammonium ion;
   injecting steam into said injection well; and
   recovering hydrocarbons and other fluids from a production well.

2. The process of claim 1 for recovering hydrocarbons, wherein said mixture is injected into a steam override zone.

3. The process of claim 1 for recovering hydrocarbons, wherein R is an alkyl radical having about 11 to about 15 carbon atoms, R' is ethylene, n has an average value of about 7, R'' is methylene and M+ is sodium.

4. The process of claim 1 for recovering hydrocarbons, wherein the concentration of said foaming agent in steam is increased as the steam injection rate is increased.

5. The process of claim 1 for recovering hydrocarbons, wherein the non-condensable gas is selected from the group consisting of nitrogen, carbon dioxide, air, methane, ethane and flue gas.

6. The process of claim 1 for recovering hydrocarbons, wherein said mixture is injected into an injection well near the beginning of steam injection.

7. The process of claim 1 for recovering hydrocarbons, wherein said mixture is injected into an injection well immediately prior to steam breakthrough at a production well.

8. The process of claim 1 for recovering hydrocarbons, wherein said mixture is injected into an injection well after steam breakthrough at a production well.

9. The process of claim 1 for recovering hydrocarbons, wherein the non-condensable gas is injected at a rate of about 0.01 to about 1.5 thousand standard cubic feet per barrel of steam in the injected mixture.

10. A process for recovering hydrocarbons from an underground hydrocarbon formation penetrated by at least one injection well and at least one production well, which comprises:
    injecting into an injection well a mixture of steam, about 0.01 to about 5 thousand standard cubic feet of a non-condensable gas per barrel of steam in the injected mixture and about 0.01% to about 5% by weight of a foaming agent based upon the weight of the steam in the injected mixture,
    said foaming agent represented by the formula, $RO(R'O)_nR''CO_2^-M^+$, where R is an alkyl radical, branched or linear, having from about 8 to about 24 carbon atoms in the alkyl chain, R' is ethylene, propylene or a mixture of ethylene and propylene, n has an average value of about 3 to about 11, R'' is methylene or ethylene, and M+ is an alkali metal or ammonium ion;
    injecting steam into said injection well; and
    recovering hydrocarbons and other fluids from a production well.

11. A process for recovering hydrocarbons from an underground hydrocarbon formation penetrated by at least one injection well and at least one production well, which comprises:
    injecting steam into an injection well;

injecting into said injection well a mixture of steam, about 0.01 to about 1.5 thousand standard cubic feet of nitrogen per barrel of steam in the injected mixture and about 0.02% to about 1.5% by weight of a foaming agent based upon the weight of the steam in the injected mixture, said foaming agent represented by the formula $$CH_3(CH_2)_{10-14}O(CH_2CH_2O)_7-CH_2-CO_2Na;$$

injecting steam into said injection well; and
recovering hydrocarbons and other fluids from a production well.

* * * * *